(12) United States Patent
Kim et al.

(10) Patent No.: US 12,395,554 B2
(45) Date of Patent: Aug. 19, 2025

(54) APPARATUS, METHOD, AND SYSTEM FOR DYNAMIC POD AUTOSCALING IN A SERVERLESS COMPUTING ENVIRONMENT

(71) Applicant: FOUNDATION OF SOONGSIL UNIVERSITY-INDUSTRY COOPERATION, Seoul (KR)

(72) Inventors: Young Han Kim, Seoul (KR); Seung Hyeon Kim, Gwacheon-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 112 days.

(21) Appl. No.: 18/515,505

(22) Filed: Nov. 21, 2023

(65) Prior Publication Data

US 2024/0205290 A1 Jun. 20, 2024

(30) Foreign Application Priority Data

Dec. 19, 2022 (KR) .................. 10-2022-0178011
Mar. 13, 2023 (KR) .................. 10-2023-0032365

(51) Int. Cl.
*H04L 67/101* (2022.01)
*H04L 67/1008* (2022.01)

(52) U.S. Cl.
CPC ........ *H04L 67/101* (2013.01); *H04L 67/1008* (2013.01)

(58) Field of Classification Search
CPC ............... H04L 67/101; H04L 67/1008; H04L 41/0896; H04L 41/0897; G06F 9/505;
(Continued)

(56) References Cited

U.S. PATENT DOCUMENTS

2018/0203784 A1* 7/2018 Mizuno ............... G06F 11/3055
2022/0156129 A1* 5/2022 Li ........................... G06F 9/542
(Continued)

FOREIGN PATENT DOCUMENTS

KR 10-2021-0060364 A 5/2021
KR 10-2022-0100982 A 7/2022

OTHER PUBLICATIONS https://1week.tistory.com/88, Knative, Kubernetes/Management, Oct. 5, 2021.
(Continued)

*Primary Examiner* — Johnny B Aguiar
(74) *Attorney, Agent, or Firm* — Stein IP LLC

(57) ABSTRACT

An apparatus, method, and system for dynamic pod autoscaling in a serverless computing environment are disclosed. A dynamic pod autoscaling apparatus in a serverless computing environment comprises a processor; and a memory connected to the processor, wherein the memory stores program instructions for performing operations comprising registering, if there is a service request, a predefined first target value, collecting concurrency/rps (request per second) information of a first number of pods corresponding to the number of replica sets that is pod autoscaled according to the first target value, calculating the first target value as a second target value using the concurrency/rps information and average resource usage of the pod, dynamically changing the number of replica sets from the first number to a second number through the second target value.

11 Claims, 6 Drawing Sheets

(58) Field of Classification Search
CPC ... G06F 9/5027; G06F 9/5077; G06F 9/45558
See application file for complete search history.

(56) References Cited

U.S. PATENT DOCUMENTS

| | | | |
|---|---|---|---|
| 2022/0237024 A1* | 7/2022 | Chen | G06F 9/50 |
| 2022/0318058 A1* | 10/2022 | Kowalczyk | G06F 9/345 |
| 2023/0109368 A1* | 4/2023 | Ni | G06F 9/505 |
| | | | 718/104 |
| 2024/0176662 A1* | 5/2024 | Liu | G06F 9/5027 |

OTHER PUBLICATIONS https://1week.tistory.com/91, Knative- Autoscaling #2, Kubernetes/Management, Oct. 12, 2021.

* cited by examiner

APPARATUS, METHOD, AND SYSTEM FOR DYNAMIC POD AUTOSCALING IN A SERVERLESS COMPUTING ENVIRONMENT

CROSS-REFERENCE TO RELATED APPLICATIONS

This application claims the benefit of Korean Application Nos. 10-2022-0178011 filed Dec. 19, 2022, and 10-2023-0032365 filed Mar. 13, 2023, in the Korean Intellectual Property Office. All disclosures of the documents named above are incorporated herein by reference.

TECHNICAL FIELD

The present invention relates to a dynamic pod autoscaling apparatus, method, and system in a serverless computing environment.

BACKGROUND ART

Kubernetes is an open-source platform for managing containerized services and workloads and is being actively used by many companies as they transition their systems to a cloud environment.

Kubernetes operates on a cluster basis, which is a set of worker nodes that host container-type applications and master nodes that manage the worker nodes. By operating multiple clusters together, the multi-cluster infrastructure has the advantages of improving application availability and reducing user waiting time.

Cloud-based services can be configured as a serverless computing environment to ensure high server availability and efficiently manage computing resources. The most important keyword in such serverless computing is pod autoscaling.

The pod autoscaler allows efficient use of computing resources by automatically generating pods when there is a request for the service and deleting the pod when there is no request for the service.

Knative, an open-source project for deploying and managing serverless applications in the Kubernetes environment, provides KnativePodAutoscaler (KPA), which can autoscale pods according to service requests.

However, KPA autoscales pods according to a target value predefined by the system administrator, and since the target value is always fixed, autoscaling can be done regardless of the resource usage of the pod. In this way, unnecessary pod autoscaling wastes computing resources and increases the server workload. Additionally, there is the inconvenience in that administrators should set the pod autoscaler differently depending on the type of workload, and the target value should be modified depending on the situation.

DISCLOSURE

Technical Issues

In order to solve the problems of the prior art described above, the present invention proposes a dynamic pod autoscaling apparatus, method, and system in a serverless computing environment that can reduce the waste of computing resources and the workload of the server.

Technical Solution

In order to achieve the above object, according to an embodiment of the present invention, a dynamic pod autoscaling apparatus in a serverless computing environment comprises a processor; and a memory connected to the processor, wherein the memory stores program instructions for performing operations comprising registering, if there is a service request, a predefined first target value, collecting concurrency/rps (request per second) information of a first number of pods corresponding to the number of replica sets that is pod autoscaled according to the first target value, calculating the first target value as a second target value using the concurrency/rps information and average resource usage of the pod, dynamically changing the number of replicasets from the first number to a second number through the second target value.

The service request may be traffic data received by Knative Service (ksvc) through Knative Revion.

The pod autoscaling according to the first and second target values may be performed by KnativePodAutoscaler (KPA) which receives the traffic data from the ksvc.

The operations may further comprise calculating an average value of CPU (Central Processing Unit) and memory usage of the pod, and calculating a second target value so that the average value is not close to minimum and maximum values of resource usage, including CPU and memory usage of a pod defined in CRD (Custom Resource Defined).

The operations may further comprise calculating a variance by dividing the number of replica sets, which is obtained by dividing the amount of the service request by the first target value, by the first target value, and calculating the second target value using the variance.

The operations may further comprise determining the second target value by adding the variance to the first target value when the average value is less than the minimum value.

The operations may further comprise determining the second target value by subtracting the variance from the first target value when the average value is greater than the maximum value.

The concurrency/rps information may be collected from a queue proxy of the pod.

The average resource usage may be calculated in a metric server connected to the pod.

According to another aspect of the present invention, a dynamic pod autoscaling system in a serverless computing environment comprises Knative Service for receiving traffic data according to a service request from Knative Revision; KnativePodAutoscaler (KPA) for calculating the number of replica sets by performing pod autoscaling according to a predefined first target value in the Knative Service; and a custom controller for collecting concurrency/rps (request per second) information of a first number of pods corresponding to the number of replica sets, and calculating the first target value as a second target value using the concurrency/rps information and average resource usage of the pod, wherein the KPA dynamically changes the number of replica sets from the first number to a second number through the second target value.

According to another aspect of the present invention, a dynamic pod autoscaling method in a serverless computing environment comprises registering, if there is a service request, a predefined first target value; collecting concurrency/rps (request per second) information of a first number of pods corresponding to the number of replica sets that is pod autoscaled according to the first target value; calculating the first target value as a second target value using the concurrency/rps information and average resource usage of the pod; and dynamically changing the number of replica sets from the first number to a second number through the second target value.

According to another aspect of the present invention, a computer program stored in a computer-readable recording medium for performing the above method is provided.

Advantageous Effects

According to the present invention, since a custom controller is used, pod autoscaling can be operated and used as desired in a serverless computing environment, thereby making up for the shortcomings of the existing pod autoscaling method.

In addition, according to the present invention, the pod autoscaling system can be used to scale considering not only the traffic environment but also the computing resource environment, thereby ensuring system availability and enabling more efficient resource utilization than before.

Furthermore, conventionally, an autoscaler should be specified and a target value should be set in advance according to the type of each serverless service, but using the structure of the present invention, the autoscaler can be unified into one and the target value can be change dynamically according to the situation.

BRIEF DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
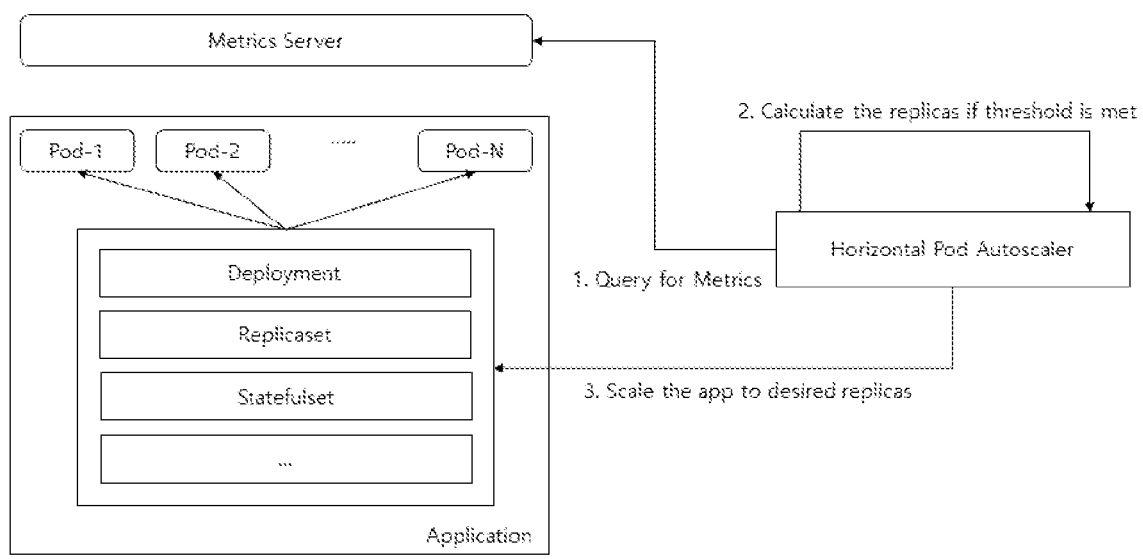
FIG. 1 is a diagram showing HPA (Horizontal Pod Autoscaler) operation in Kubernetes.

Since the present invention can make various changes and have various embodiments, specific embodiments will be illustrated in the drawings and described in detail in the detailed description. However, this is not intended to limit the present invention to specific embodiments, and should be understood to include all changes, equivalents, and substitutes included in the spirit and technical scope of the present invention.

The terms used herein are only used to describe specific embodiments and are not intended to limit the invention. Singular expressions include plural expressions unless the context clearly dictates otherwise. In this specification, terms such as "comprise" or "have" are intended to indicate the presence of features, numbers, steps, operations, components, parts, or combinations thereof described in the specification, but are not intended to exclude in advance the possibility of the existence or addition of one or more other features, numbers, steps, operations, components, parts, or combinations thereof.

In addition, the components of the embodiments described with reference to each drawing are not limited to the corresponding embodiments, and may be implemented to be included in other embodiments within the scope of maintaining the technical spirit of the present invention, and a plurality of embodiments may be re-implemented as a single integrated embodiment even if separate descriptions are omitted.

In addition, when describing with reference to the accompanying drawings, identical or related reference numerals will be assigned to identical components regardless of the reference numerals, and overlapping descriptions thereof will be omitted. In describing the present invention, if it is determined that a detailed description of related known technologies may unnecessarily obscure the gist of the present invention, the detailed description will be omitted.

In the present invention, a structure is provided, in which the pod autoscaling method can be modified and used as desired using a custom controller, the administrator can add the desired content according to the situation by using CRD (Custom Resource Defined), and accordingly autoscaling can be performed by taking into account the traffic and computing resource situation.

Before explaining pod autoscaling according to this embodiment, pod autoscaling in general Kubernetes will be explained.

Kubernetes basically provides two pod autoscalers (Horizontal Pod Autoscaler (HPA) and Vertical Pod Autoscaler (VPA)).

FIG. 1 is a diagram showing HPA operation in Kubernetes.

Referring to FIG. 1, HPA operates by generating or deleting the number of pods according to the demand of the workload. Computing resource information (resource usage) of deployed pods is collected through the Metric-server, and if the resource usage previously defined by the administrator in the CRD is exceeded, the number of replica sets corresponding to the new pod is calculated and pod autoscaling is performed.

Since HPA autoscales pods considering only computing resources, it cannot consider the amount of requested traffic, and the minReplicas value should be at least greater than 1, making scale-to-zero, the most important element of serverless computing, impossible.

VPA operates by increasing or decreasing the size of the pod to suit the demand of the workload. Because VPA is a beta feature rather than an official Kubernetes feature, it is not safe to apply to actual services. Since VPA is a method of adjusting the capacity of the pod rather than increasing or decreasing the number of pods according to the resource occupancy of the pod, when updating, the pod is restarted.

Serverless computing is a method that eliminates the need to manage servers from the user or developer's perspective. In a cloud environment, pods are scale-to-zero or scale-from-zero as needed. Knative is an open-source project to implement such a serverless computing environment in Kubernetes. Knative is an open-source project that helps deploy and manage serverless applications in the Kubernetes environment and collects multiple events without dependency on a specific cloud.

Figure 2:
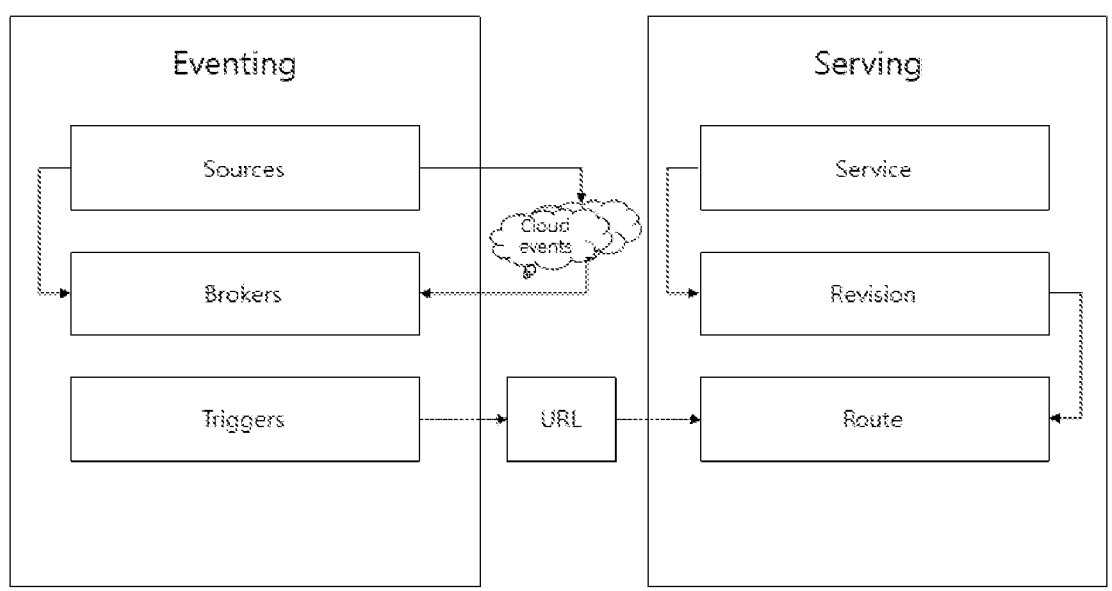
FIG. 2 is a diagram showing the components of Knative.

FIG. 2 is a diagram showing the components of Knative.

Referring to FIG. 2, Knative is largely composed of two components, that is, Eventing and Serving.

Knative Eventing can collect various event formats in a cloud environment through multiple cloud vendors or a source appropriate for each format. Events collected from the source are converted to CloudEvents format and stored in Broker in a messaging bus method. In Trigger, a URL (Uniform Resource Locator) request (service request) is delivered to Knative Service (ksvc) according to a specific triggering point predefined by the administrator.

When a URL request is passed to Knative Serving, which Revision it should be sent to is determined through Route.

Revision is specification information that has been configured in advance, such as ksvc's image version and traffic distribution amount. When request information is delivered to specific ksvc through Revision, ksvc automatically scales pods through an autoscaler predefined by the administrator or automatically deletes pods if there are no requests for a certain period of time.

Knative Serving supports a total of two autoscalers, that is, KnativePodAutoscaler (KPA), which autoscales pods or scale-to-zero according to service requests, and HPA, which autoscales according to the CPU resource status of the pod. When generating ksvc, the administrator should specify one autoscaler, and the pods are managed according to the operation method of the autoscaler.

As mentioned above, Knative provides two types of autoscalers, that is, KPA and HPA.

KPA changes the number of replica sets of pods managed by ksvc to 0 when ksvc does not receive traffic for a certain period of time, making it scale-to-zero. And when ksvc receives traffic, the pods are scaled out according to the target value predefined by the administrator.

For example, if the administrator sets the target value to 10 in advance when generating ksvc, when ksvc receives 50 traffic requests, the number of pods is scaled out to 5 (number of replica sets)=50 (traffic request)/10 (target value). Through KPA, which operates in the same manner as above, pods can be autoscaled or scale-to-zero according to service requests.

HorizontalPodAutoscaler (HPA), an autoscaler supported by Kubernetes by default, autoscales pods according to CPU resource status. For example, when the target value of the CPU of a pod managed by HPA is set to 60% and the min and max values are set to 1 and 10, when the average CPU usage of the pod exceeds the target value and reaches 320%, the replica set value is automatically scaled out from 1 to 6. And when the average CPU usage of the pod decreases to 30%, the replica set value is scaled down from 6 to 1 again.

KPA can autoscale or scale-to-zero pods depending on the service request amount.

Figure 3:
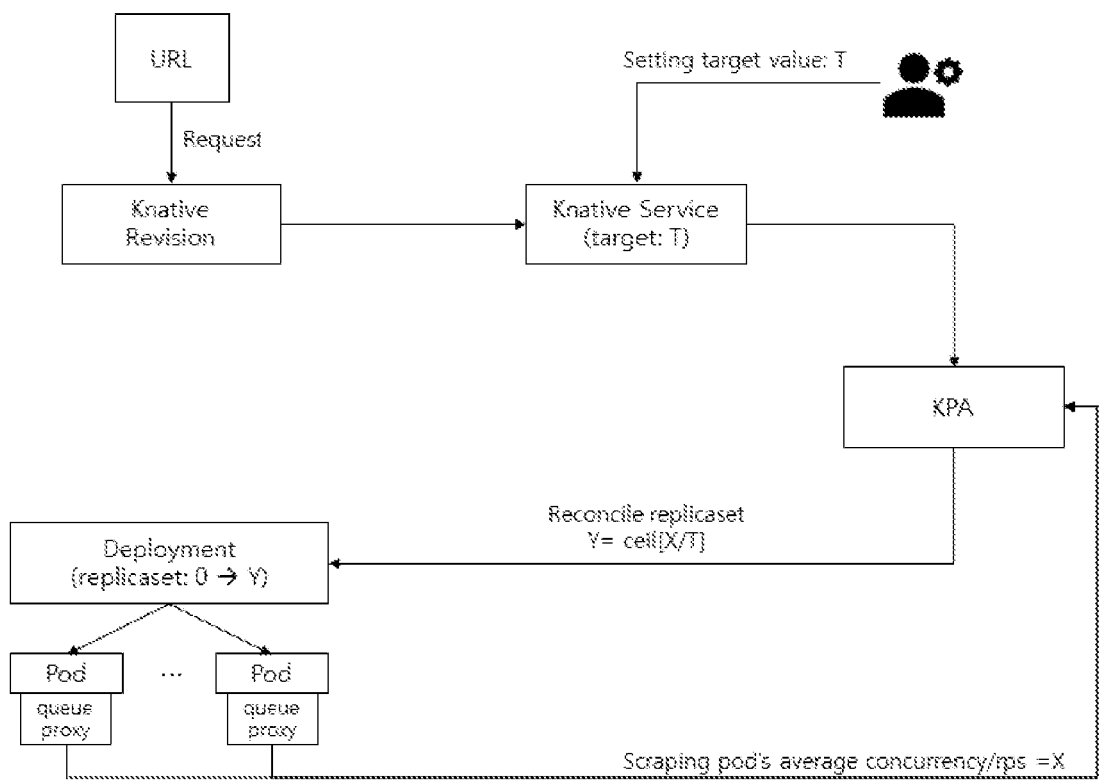
FIG. 3 is a diagram showing KPA's pod autoscaling process.

FIG. 3 is a diagram showing KPA's pod autoscaling process.

As shown in FIG. 3, when receiving a traffic request, if the administrator sets the target value of ksvc to T, KPA autoscales the pod by changing the replica set to the value X/T=Y.

However, since the above operation method does not take into account the CPU resource status of the Pod, when the traffic amount increases rapidly, the pod is autoscaled indiscriminately regardless of the resources that the pod can accommodate, wasting server resources. Since the traffic amount is not always constant, the administrator should frequently change the target value to match the resource size that the pod can accommodate.

Figure 4:
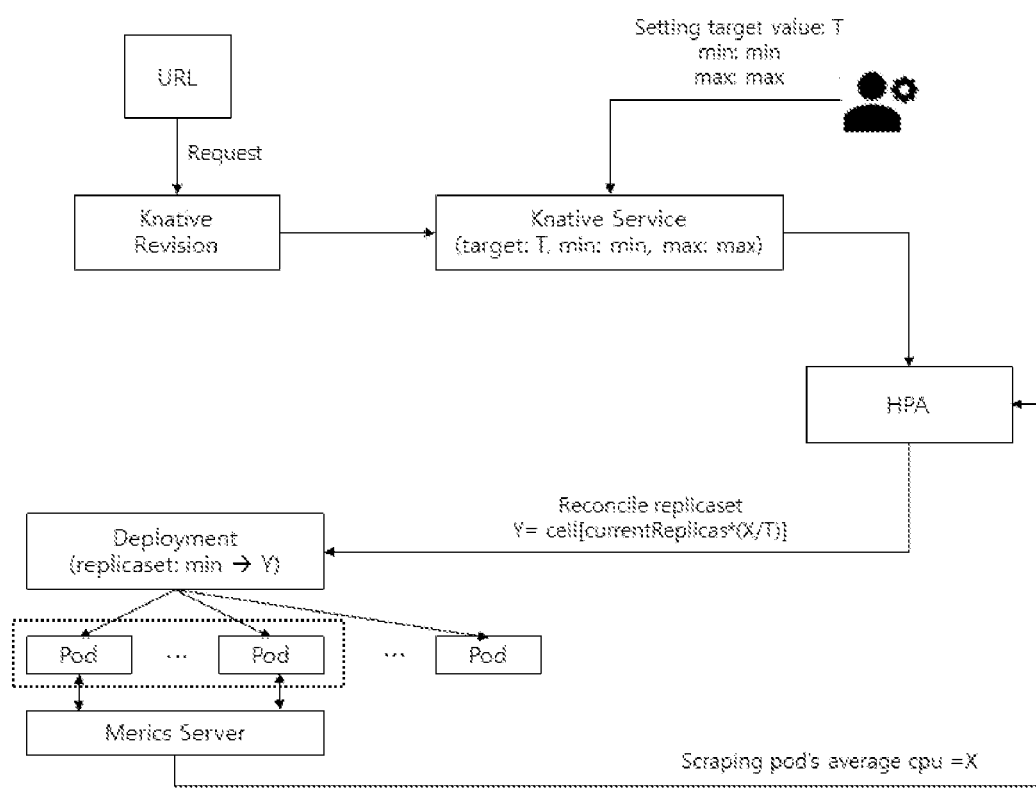
FIG. 4 is a diagram showing HPA's pod autoscaling process.

FIG. 4 is a diagram showing HPA's pod autoscaling process.

As shown in FIG. 4, HPA can autoscale pods according to CPU resource status. When receiving a service request, HPA measures the average CPU value of the pod and changes the replica set to the value X/T=Y if it exceeds the target value T predefined by the administrator.

Unlike KPA, the CPU value can be considered, but because the min value is set to 1 or more, scale-to-zero is not possible, and the number of autoscaled pods cannot exceed the predefined max value, so when traffic amount increases rapidly, the administrator should change the target value and min and max values.

In this way, for both KPA and HPA, from the system administrator's perspective, if a pod's CPU resources become insufficient or the traffic amount increases rapidly, the target value should be changed in real-time to suit the situation.

In this embodiment, an autoscaling structure that changes the fixed KPA target value to the optimal target value considering both computing resources and traffic amount through CRD and a custom controller is provided.

Figure 5:
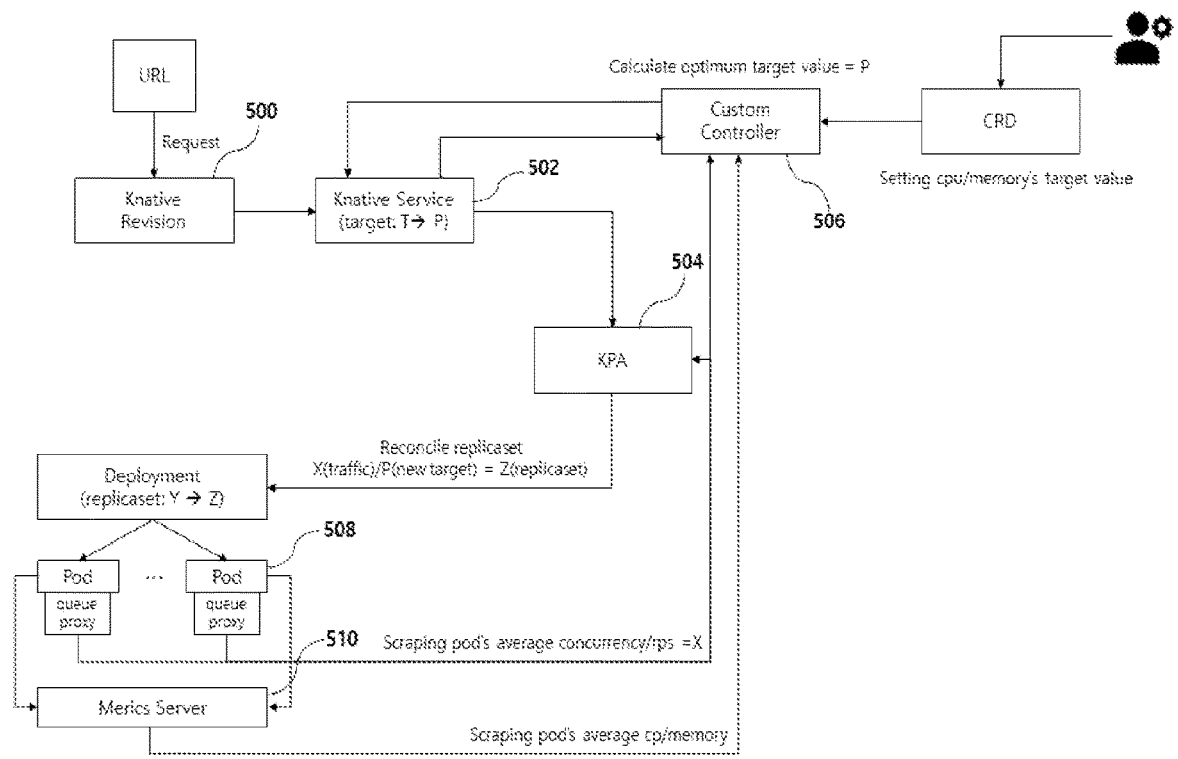
FIG. 5 is a diagram showing the pod autoscaling structure in a serverless computing system according to a preferred embodiment of the present invention.

FIG. 5 is a diagram showing the pod autoscaling structure in a serverless computing system according to a preferred embodiment of the present invention.

As shown in FIG. 5, the pod autoscaling system according to this embodiment may comprise Knative Revision 500, Knative Service (ksvc) 502, KnativePodAutoscaler (KPA) 504, and custom controller 506.

The ksvc 502 receives traffic data according to the service request from Knative Revision 500.

The KPA 504 performs pod autoscaling according to the first target value predefined in ksvc 502 to calculate the number of replica sets.

The custom controller 504 according to this embodiment collects concurrency/rps (request per second) information of the first number of pods 508 corresponding to the number of replicasets, calculates the average resource usage of the pod, and calculates the second target value using concurrency/rps information and average resource usage.

The KPA 504 dynamically changes the number of replica sets of the pod from the first number to the second number through the newly calculated second target value.

The custom controller 506 according to this embodiment calculates the average value of resource usage, such as CPU and memory usage of the pod 508, and calculates a second target value so that the average value is not close to the minimum and maximum values of the resource usage including CPU and memory usage of the pod defined in CRD (Custom Resource Defined).

To calculate the average CPU usage of the pod 508 with the custom controller 506, the Exponential Moving Average Algorithm can be used as follows.

$$\text{Exponential Moving Average } (EMA) = \quad \text{[Equation 1]}$$
$$(Pn + aPn-1 + a2Pn-2 + a3Pn-3 + \ldots)/K \text{ where } K =$$
$$1 + a + a2 + \ldots = 1/(1-a)$$

According to this embodiment, the custom controller 506 calculates the variance by dividing the number of replicasets, which is obtained by dividing the amount of service requests by the first target value, by the first target value.

As the service request amount increases, the variance increases, so the range of change in the newly calculated target value also increases.

Figure 6:
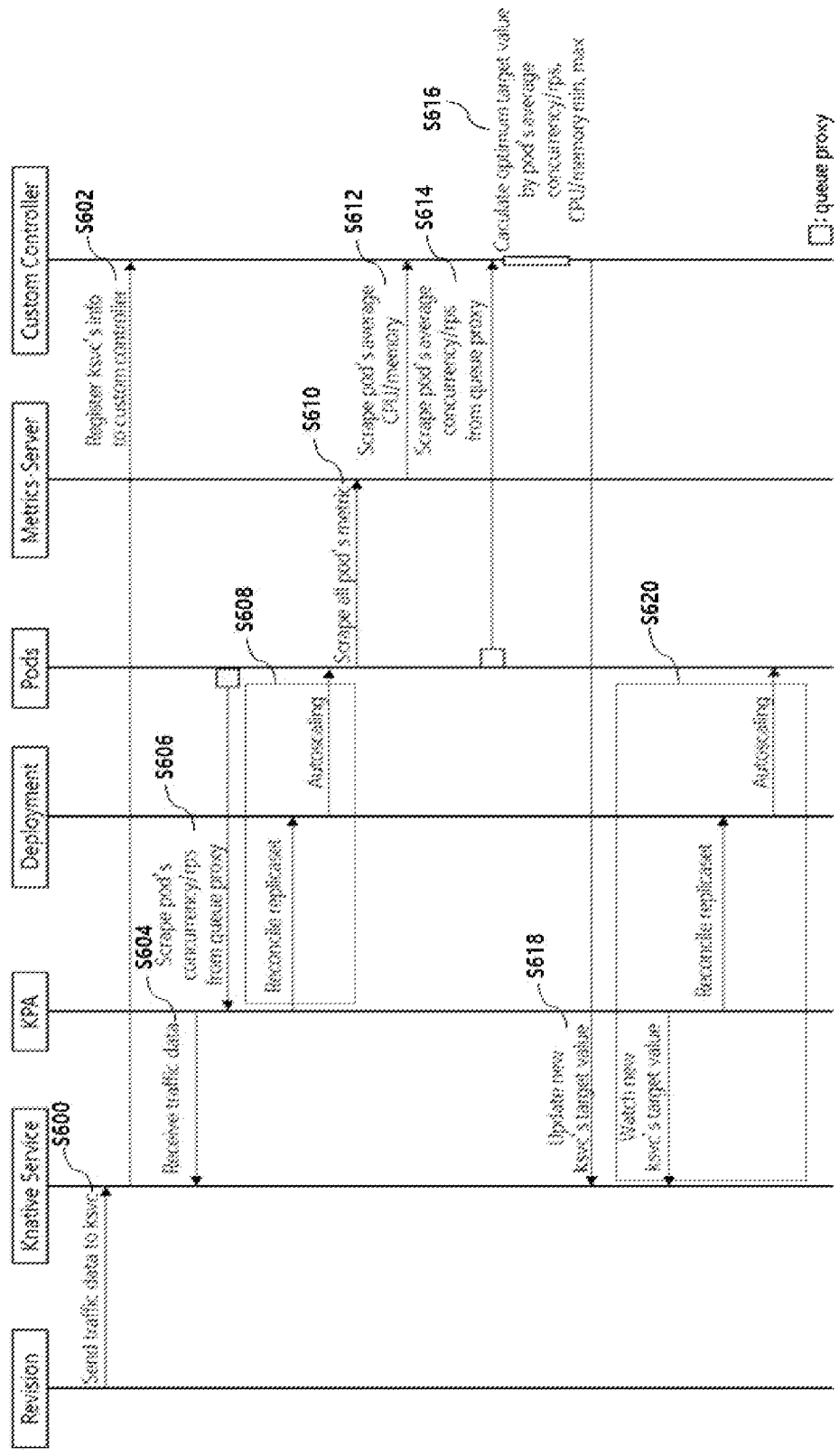
FIG. 6 is a diagram illustrating the pod autoscaling process according to the embodiment.

If the CPU average value calculated in Equation 1 is less than the minimum value, the target value calculation algorithm equation for calculating the optimal target value through the custom controller by increasing the target value by adding the variance to the existing target value is as follows.

$$\text{replicaset} = \frac{\text{request}}{\text{target}} \quad \text{[Equation 2]}$$

$$\text{variance} = \frac{\text{replicaset}}{\text{target}}$$

if $avgCPU < minCPU$, new target = target + variance
else if $avgCPU > maxCPU$, new target = target − variance FIG. 6 is a diagram illustrating the pod autoscaling process according to this embodiment.

Referring to FIG. 6, when Knative Revision 500 receives a service request, Knative Revision 500 transfers traffic data to ksvc 502 (step 600).

Additionally, when there is a service request, ksvc 502 registers ksvc information (first target value) in the custom controller 506 (step 602).

KPA 504 receives traffic data from ksvc 502 (step 604), and receives concurrency/request per second (rps) information from pod 508 (step 606).

The KPA 504 performs pod autoscaling according to the first target value predefined in the CRD (step 608).

The metrics server 510 collects the resource usage of the pod and calculates the average resource usage (step 610).

The custom controller 506 receives the collected average resource usage and the pod's concurrency/rps information collected from the pod's queue proxy (steps 612 and 614).

The custom controller 506 calculates a second target value using average resource usage and concurrency/rps information (step 616).

Here, the second target value is defined as a value that prevents the average resource usage (average value) from approaching the minimum and maximum values of resource usage, including the CPU and memory usage of the pod defined in CRD (Custom Resource Defined).

The second target value is delivered to the ksvc 502 and updated (step 618), and the KPA 504 dynamically changes the number of replicasets from the first number to a second number through the new second target value.

The dynamic pod autoscaling method according to this embodiment can also be implemented in the form of a recording medium containing instructions executable by a computer, such as an application or program module executed by a computer. A computer-readable medium can be any available medium that can be accessed by a computer and includes both volatile and non-volatile medium, removable and non-removable medium. Additionally, a computer-readable medium may include a computer storage medium. A computer storage medium includes both volatile and non-volatile, removable and non-removable medium implemented in any method or technology for storage of information such as computer-readable instructions, data structures, program modules, or other data.

The dynamic pod autoscaling method described above may be executed by an application installed by default on the terminal (this may include programs included in the platform or operating system installed by default on the terminal), and may also be executed by an application (i.e., program) installed directly on the master terminal by a user through an application providing server such as an application store server, or a web server related to the application or the service. In this sense, the dynamic pod autoscaling method described above can be implemented as an application (i.e., program) installed by default in the terminal or directly installed by the user and recorded on a computer-readable recording medium.

The above-described embodiments of the present invention have been disclosed for illustrative purposes, and those skilled in the art will be able to make various modifications, changes, and additions within the spirit and scope of the present invention, and such modifications, changes, and additions should be regarded as falling within the scope of the patent claims below.

The invention claimed is:

1. A dynamic pod autoscaling apparatus in a serverless computing environment comprising:
   a processor; and
   a memory connected to the processor,
   wherein the memory stores program instructions for performing operations comprising:
   registering, after receiving a service request, a predefined first target value;
   collecting concurrency/rps (request per second) information of a first number of pods corresponding to a number of replica sets that is pod autoscaled according to the first target value;
   calculating the first target value as a second target value using the concurrency/rps information and average resource usage of the first number of pods;
   dynamically changing the number of replica sets from the first number to a second number through the second target value;
   calculating an average value of CPU (Central Processing Unit) and memory usage of the first number of pods;
   calculating the second target value to prevent the average value being close to minimum and maximum values of resource usage, including CPU and memory usage defined in CRD (Custom Resource Defined);
   calculating a variance by first obtaining the number of replica sets through dividing an amount of service requests by the first target value, and subsequently dividing the obtained number of replica sets by the first target value; and
   calculating the second target value using the variance.

2. The apparatus of claim 1, wherein the service request is traffic data received by a service interface.

3. The apparatus of claim 2, wherein pod autoscaling according to the first and second target values is performed by a pod autosclear module that receives the traffic data from the service interface.

4. The apparatus of claim 1, wherein the operations further comprise:
   determining the second target value by adding the variance to the first target value when the average value is less than the minimum value.

5. The apparatus of claim 1, wherein the operations further comprise:
   determining the second target value by subtracting the variance from the first target value when the average value is greater than the maximum value.

6. The apparatus of claim 1, wherein the concurrency/rps information is collected from a queue proxy of the first number of pods.

7. The apparatus of claim 1, wherein the average resource usage is calculated in a metric server connected to the first number of pods.

8. A dynamic pod autoscaling system in a serverless computing environment comprising:
   a service interface for receiving traffic data according to a service request;

a pod autoscaler module for calculating a number of replica sets by performing pod autoscaling according to a predefined first target value in the service interface; and a custom controller for collecting concurrency/rps (request per second) information of a first number of pods corresponding to the number of replica sets, and calculating the first target value as a second target value using the concurrency/rps information and average resource usage of the first number of pods, wherein the pod autoscaler module dynamically changes the number of replica sets from the first number to a second number through the second target value wherein the custom controller:

calculates an average value of CPU (Central Processing Unit) and memory usage of the first number of pods;

calculates the second target value to prevent the average value being close to minimum and maximum values of resource usage, including CPU and memory usage defined in CRD (Custom Resource Defined);

calculates a variance by first obtaining the number of replica sets through dividing an amount of service requests by the first target value, and subsequently dividing the obtained number of replica sets by the first target value; and calculates the second target value using the variance.

9. The system of claim 8, wherein the custom controller:

determines the second target value by adding the variance to the first target value when the average value is less than the minimum value; and determines the second target value by subtracting the variance from the first target value when the average value is greater than the maximum value.

10. A dynamic pod autoscaling method in a serverless computing environment comprising:

registering, after receiving a service request, a predefined first target value;

collecting concurrency/rps (request per second) information of a first number of pods corresponding to a number of replica sets that is pod autoscaled according to the first target value;

calculating the first target value as a second target value using the concurrency/rps information and average resource usage of the first number of pods; and dynamically changing the number of replica sets from the first number to a second number through the second target value, wherein calculating the first target value as a second target value comprises:

calculating an average value of CPU (Central Processing Unit) and memory usage of the first number of pods;

calculating the second target value to prevent the average value being close to minimum and maximum values of resource usage, including CPU and memory usage defined in CRD (Custom Resource Defined);

calculating a variance by first obtaining the number of replica sets through dividing an amount of service requests by the first target value, and subsequently dividing the obtained number of replica sets by the first target value; and calculating the second target value using the variance.

11. A non-transitory computer-readable recording medium having stored thereon a computer program comprising instructions that, when executed by a processor, cause the processor to:

register, after receiving a service request, a predefined first target value;

collect concurrency/rps (request per second) information of a first number of pods corresponding to a number of replica sets that is pod autoscaled according to the first target value;

calculate the first target value as a second target value using the concurrency/rps information and average resource usage of the first number of pods;

dynamically change the number of replica sets from the first number to a second number through the second target value;

calculate an average value of CPU (Central Processing Unit) and memory usage of the first number of pods;

calculate the second target value to prevent the average value being close to minimum and maximum values of resource usage, including CPU and memory usage defined in CRD (Custom Resource Defined);

calculate a variance by first obtaining the number of replica sets through dividing an amount of service requests by the first target value, and subsequently dividing the obtained number of replica sets by the first target value; and calculate the second target value using the variance.

* * * * *